May 18, 1954     A. J. BÜCHI     2,678,529
EXHAUST GAS MANIFOLD FOR INTERNAL-COMBUSTION ENGINES
Filed Jan. 24, 1950     3 Sheets-Sheet 1
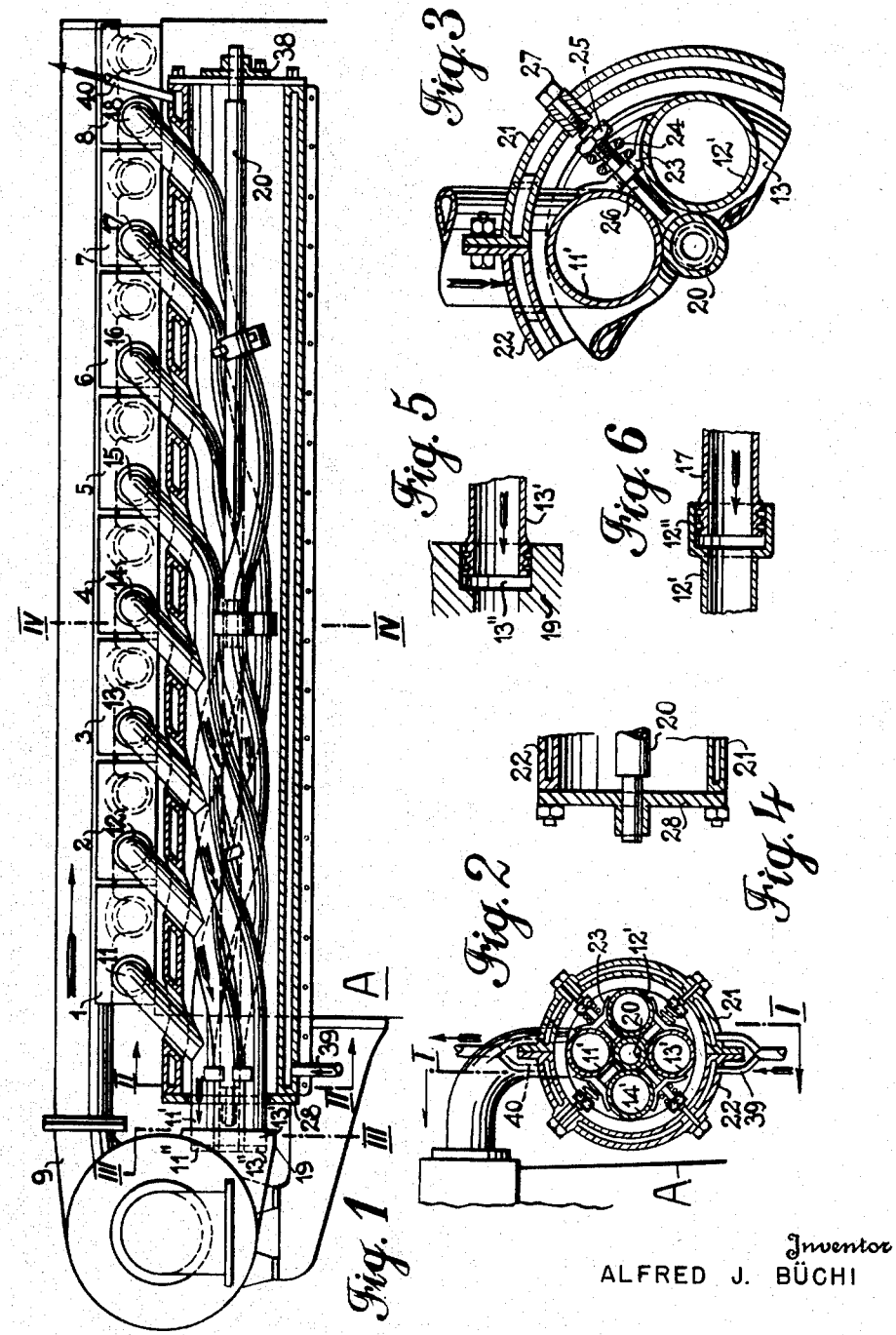
Inventor
ALFRED J. BÜCHI May 18, 1954  A. J. BÜCHI  2,678,529
EXHAUST GAS MANIFOLD FOR INTERNAL-COMBUSTION ENGINES
Filed Jan. 24, 1950  3 Sheets-Sheet 2
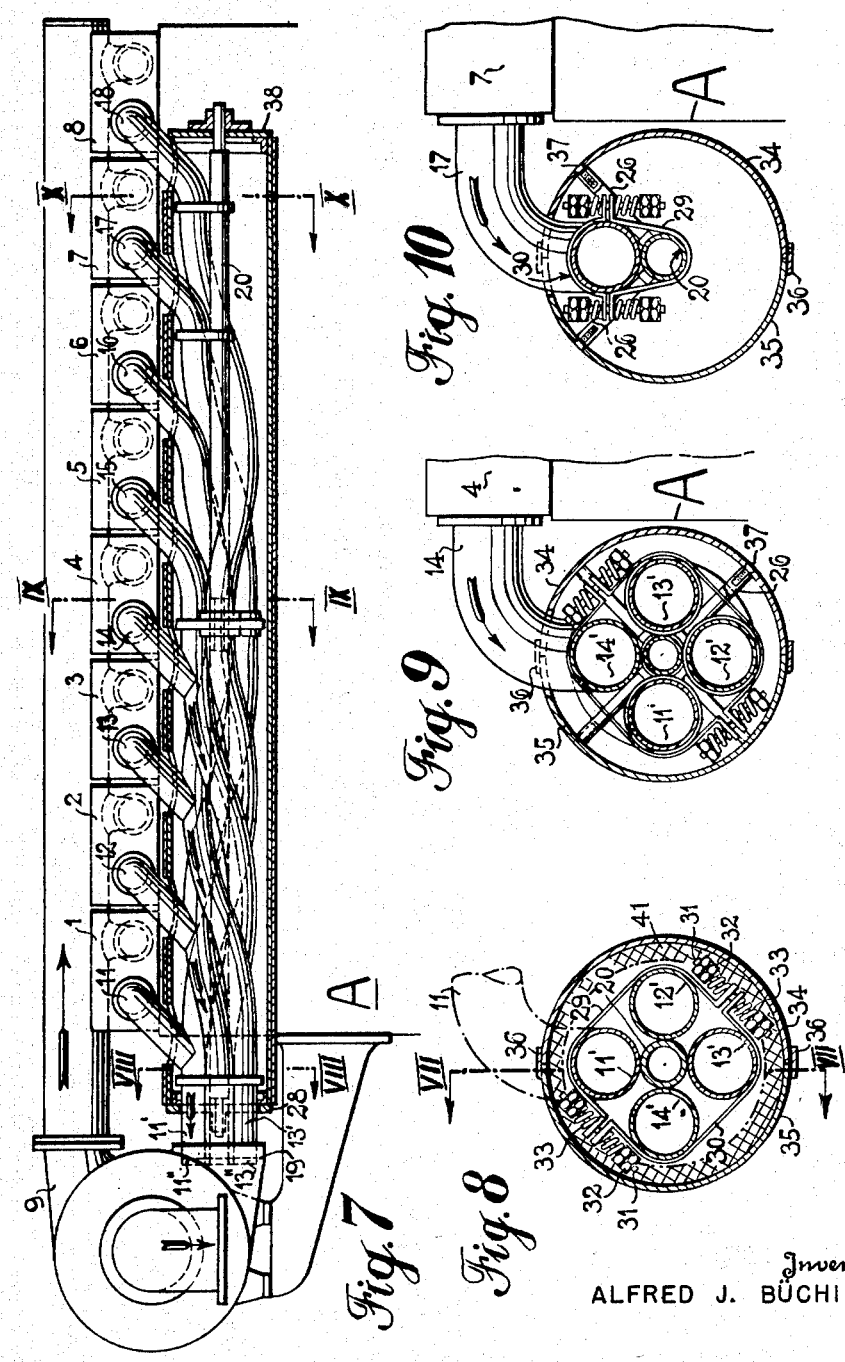
Inventor
ALFRED J. BÜCHI May 18, 1954  A. J. BÜCHI  2,678,529
EXHAUST GAS MANIFOLD FOR INTERNAL-COMBUSTION ENGINES
Filed Jan. 24, 1950  3 Sheets-Sheet 3
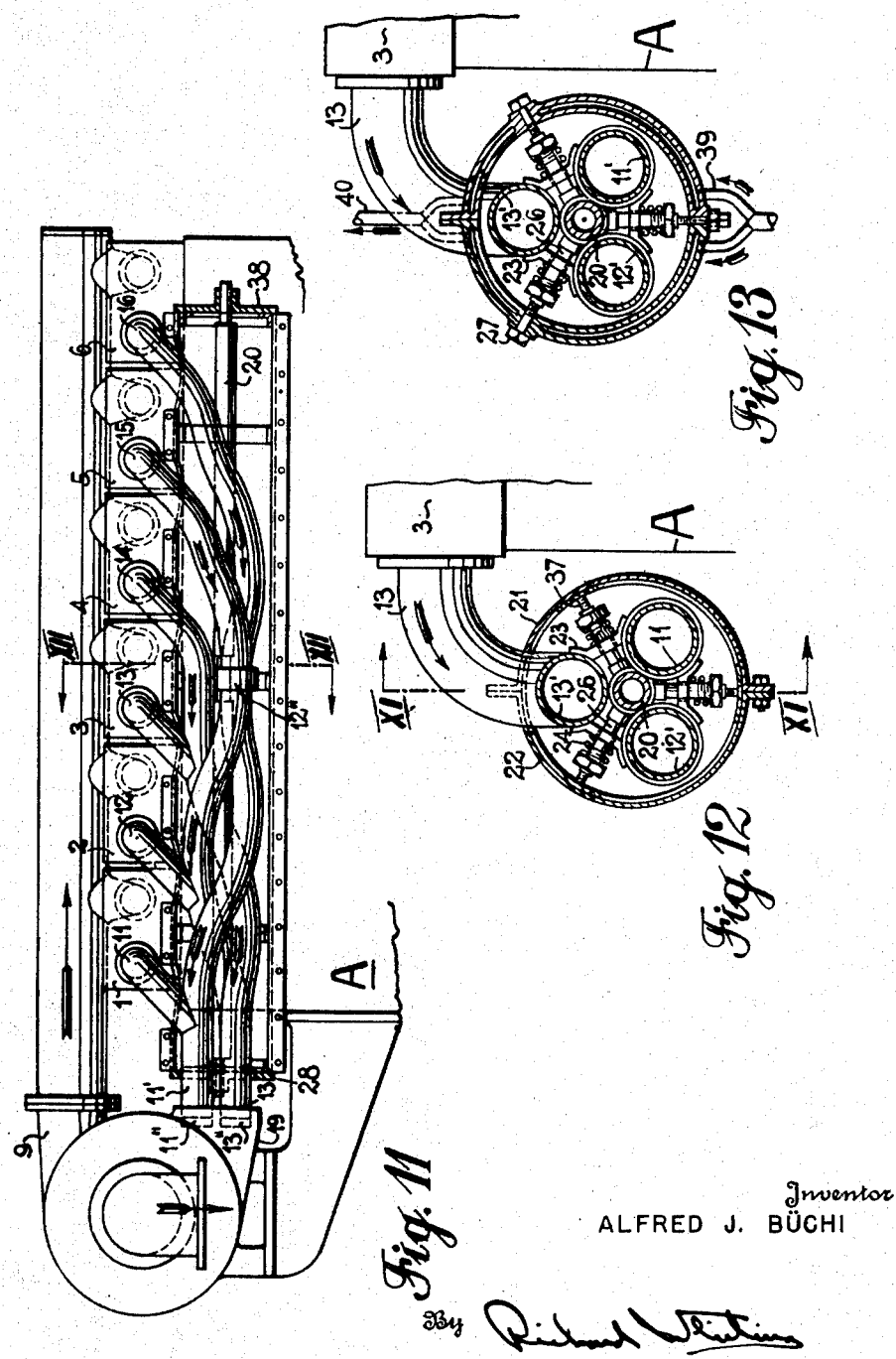
Inventor
ALFRED J. BÜCHI Patented May 18, 1954

2,678,529

UNITED STATES PATENT OFFICE 2,678,529

EXHAUST GAS MANIFOLD FOR INTERNAL-COMBUSTION ENGINES

Alfred J. Büchi, Winterthur, Switzerland

Application January 24, 1950, Serial No. 140,189

14 Claims. (Cl. 60—29)

This invention relates to an exhaust gas manifold for internal combustion engines and particularly to a manifold comprising a plurality of exhaust gas passages between a multi-cylinder internal combustion engine and its exhaust gas turbine or turbines exhausting similarly to what is well known in the art as the Büchi system of turbocharging and which is the subject of my U. S. Letters Patent No. 1,895,538 to which reference is hereby made.

It is sufficient to state that my said patent teaches among other things the division of the cylinders of an engine into groups each of which exhausts into a manifold which is maintained separate from the other manifolds up to the turbine or turbines. In the many applications of my invention described in my said Letters Patent since its first reduction to practice, much thought has been given to working out a suitable manifold arrangement which will be neat and compact, will prevent excessive heat radiation, may provide fluid cooling, if desired, but which does not contain sharp bends, high entrance angles and other undesirable characteristics which may interfere with the most efficient functioning of the engine working according to my said system.

Thus, it has been proposed to build manifolds from plates and several pipe pieces which were combined by welding to a rigidly or integrally connected structural piece and which have included provision for direct water-cooling of the thus constructed manifold with separate exhaust gas ducts. Manifolds of this type of design possess many draw-backs and have not represented the desired solution of the arrangement problems inherently presented.

In some of such manifolds an annular space between two co-axially disposed pipes is sectionalized by radially disposed division plates providing for several helicoidally shaped ducts for the exhaust gases. The plates are welded to the inner and outer cylindrical surfaces of the co-axially disposed pipes. Cooling water circulates through the inner pipe space and through another annular space formed by a third pipe—co-axially disposed around those other two co-axial pipes—which is also the outer wall of this manifold. Each of the several exhaust gas ducts of such manifolds have cross-sectional areas with four nearly rectangular corners. The cooling system provides for direct cooling of both the inner and the outer cylindrical segment walls of the several separate ducts of the manifold, while the helicoidally shaped division plates in the annular space between the first and second co-axial pipes are not in direct contact with the circulating cooling water at all and remain therefore practically uncooled. Moreover, the described cross-sectional areas of such exhaust gas ducts lack what may be called the streamline feature necessary for efficient performance, i. e. for minimum friction losses in a manifold. For example, the gas contacting surface is greater in such ducts than in ducts which are circular throughout in cross-section; sharp corners are present and the gas passage cross-sections change abruptly from one shape at the engine outlet to another in the manifold. Hence the frictional losses in kinetic energy of the exhaust gas in such passages are much greater than in gas passages which are circular throughout. Furthermore, where the gas passage walls have relatively large surfaces and are directly cooled by the circulating water, there is an excessive withdrawal of heat energy from the exhaust gases which diminishes further the energy of the gases in the manifold and decreases the efficiency of the turbine driven by said gases.

A further serious drawback of such a manifold is the unequal heat expansion in radial as well as in axial direction of the different parts (such as the division plates) of a manifold welded rigidly together, partly directly cooled and partly uncooled. These conditions introduce high mechanical stresses on the different parts which may cause breakages or even destruction of the manifold. Moreover such a manifold is difficult to fabricate, to inspect and to repair.

According to my invention I provide an exhaust gas manifold comprising a plurality of exhaust gas passages extending between the individual cylinder ports of a multi-cylinder internal combustion engine and its exhaust gas turbine or turbines in which the exhaust gas passages consist of several distinct exhaust gas pipes which are at least partly helically contiguously wound around a separate central core and fixed thereon to constitute an aggregate. These pipes are provided with branch-off pipes which have their free ends fastened to the exhaust port connections of the cylinders. Relative location of all branch-off pipes and the pitch of the windings are chosen to provide for equal alignment of all branch-off pipes leading to the exhaust ports on the engine cylinders. All branch-off pipes are similar in shape and have nearly equal lengths. A tubular, preferably multi-part envelope or shell is placed around the exhaust piping system or aggregate. The inside space of the shell is so dimensioned to prevent a direct contact of the inside surface of the shell with the exhaust gas pipes. Openings in the shell for the branch-off pipes are large enough to clear completely the branch-off pipes under any conditions and also at the very highest gas temperatures. By this arrangement the envelope is not heated up by direct conductive heat transfer from the hot exhaust gas pipes.

The exhaust pipes in an arrangement according to my present invention are not artificially cooled. The envelope, however, may be provided with or without cooling. The entire free space inside the envelope may be filled with heat insulating material, or only the inside wall of the envelope may be covered with one or several layers of heat insulating material; heat radiation from the hot exhaust gas pipes upon the shell is thereby restricted or completely prevented.

Careful consideration is given to the construction which is to combine the shell and pipe aggregate. Besides the above described spaced relation between the shell and the pipe aggregate, the respective mountings to fix the shell upon the core are so arranged that indirect heat transfer to the shell via the mountings is kept at a minimum. Also the shell, the core and the exhaust gas pipes are so constructed and arranged in relation to each other that independent free expansion of these parts is assured at all times. The combination of the envelope and the manifold exhaust pipe aggregate is also such that under any operating condition the envelope may be removed from over the hot exhaust pipes to permit inspection of the latter and afterwards may be replaced without interrupting the operation of the engine. Whether the heat insulating material is fixed to the inside wall of the shell, or placed in the free space between the shell and the exhaust gas pipes, it can be easily removed from the exhaust pipes in case of necessity. Transfer of heat by conduction or otherwise to the envelope is hindered because there does not exist any direct contact between the very hot uncooled exhaust gas pipes, and the envelope or shell. A contact occurs only over the core and the mountings for the envelope. Artificial cooling may give the shell a low temperature throughout. Because direct cooling for the exhaust pipes is not used, the heat losses of the exhaust gases are to a very great extent eliminated.

The exhaust pipes and the core are preferably of circular cross-sections. In order to obtain a steadfast structure the exhaust pipe bundle is strapped together around the separate central core. The strapping includes, however, resilient parts permitting free expansion of the individual exhaust gas pipes when the latter are heated by the very hot exhaust gases. In place of strappings, anchor-bolts fastened to the core member and suitable fittings including resilient means may also be used to steadfastly aggregate the exhaust pipes. In the latter case it is possible to secure the shell to the separate central core by the use of some of the same parts employed to fasten the exhaust pipe bundle in a flexible manner upon said core, as for instance, by screws which, after placement of the multi-part envelope or shell, are applied to screw-threadedly engage such parts.

Expansion joints may be inserted at suitable points preferably between two engine exhaust connections of the respective manifold exhaust pipe and also at the discharge point of said pipes into the gas turbine. The division of the pipes, required for the insertion of expansion joints, is useful for the assemblage of the individual exhaust pipes with the separate central core and permits also the fabrication of separate relatively short twisted exhaust pipe portions of a desired pitch.

Since the exhaust gas blast of an internal combustion engine may attain sound velocity and is productive of very high temperatures, losses in kinetic energy of the gas due to friction and heat transfer may become quite substantial unless certain design features are adhered to. It is an important feature of the manifold exhaust piping system described in this application that such losses are kept at a minimum. This is achieved by employing throughout the aggregate circular conduits for the exhaust gases, which conduits provide a minimum circumferential surface for a required cross-sectional area for a certain gas quantity; by effecting the greatest possible reduction of bends or turns; and by eliminating cross-sectional changes over the entire lengths of the exhaust gas passages. Only a minimum number of windings around the central core are necessary. Some windings, however, are required to permit the branch-off pipes to be aligned and to mate with certain of the exhaust ports of the cylinders. No inactive or blind pipe ends are present which increase the volumes of the exhaust gas conduits between the engine and the turbine and which may initiate whirling movements of the gas and create additional heat and other losses. The exhaust pipes for the respective cylinders extend only from the port-hole to the turbine entrance and do not run along the whole length of the engine as with presently known arrangements.

It is an important feature of my invention that provision is made to reduce heat and flow losses of the exhaust gas to a minimum, while the temperature of the shell surrounding the exhaust gas pipe aggregate is kept at a low level.

Another important feature of my present invention is the provision for a manifold exhaust pipe aggregate with unrestrained free heat expansion of all constructional parts of different temperatures eliminating thereby mechanical stresses due to unequal expansion of welded or otherwise rigidly connected parts.

Furthermore the entire system may be built economically either entirely in the factory and mounted as a whole in the field, or its parts may be built in the factory and assembled in the field.

All welding, such as at the junctions of the pipe branches to the manifold exhaust gas pipe, may be easily accomplished from the outside and is always readily accessible for inspection.

These described and other features of my invention will be apparent by the description of various embodiments illustrated by way of examples in the accompanying drawings, in which—

Fig. 1 is an axial section on the line I—I in Fig. 2 through the shell or envelope exposing the exhaust piping aggregate on an eight cylinder internal combustion engine including an exhaust gas turbine.

Fig. 2 is a cross-section on the line II—II in Fig. 1, seen in the direction of the arrows.

Fig. 3 shows in an enlarged scale a portion of Fig. 2 illustrating the manner of securing the envelope or shell to the central core element, the view being partly in section on the line III—III in Fig. 1.

Fig. 4 is a fragmentary axial section on the line IV—IV in Fig. 1 illustrating the manner of securing the end portions of the envelope to the central core.

Fig. 5 is an axial section through a pipe connection at the turbine which permits heat expansion of the pipe.

Fig. 6 is an axial section through an expansion joint between two portions of a pipe.

The Figures 7-10 show a second embodiment pertaining also to an eight cylinder internal combustion engine.

Fig. 7 is a view on the line VII—VII in Fig. 8 similar to that shown in Fig. 1.

Fig. 8 is a section on the line VIII—VIII of Fig. 7.

Fig. 9 is a section on the line IX—IX of Fig. 7.

Fig. 10 is a section on the line X—X of Fig. 7.

All sections are seen in the direction of the arrows shown.

The Figures 11-13 show a third embodiment relating to a six cylinder internal combustion engine.

Fig. 11 is a view on the line XI—XI in Fig. 12 similar to that shown in Fig. 1 or Fig. 7.

Fig. 12 is a section on the line XII—XII of Fig. 11.

Fig. 13 is also a section on the line XII—XII of Fig. 11 but relating to an embodiment, where the envelope is formed with spaces for water-cooling.

Referring first to Figures 1 to 10, the eight cylinders of the engine "A" are indicated diagrammatically at 1—8. 9 indicates a blower which supplies the engine "A" with the air charge. The exhaust gas conduits which are attached to the individual cylinders are numbered 11—18.

These conduits are branch-off pipes welded in certain physical combination to the manifold pipes 11'—14' which discharge into an exhaust gas turbine 19. In the several illustrations given each manifold pipe has two branches. The cylinders 1 and 8 exhaust into the manifold exhaust pipe 11', the cylinders 2 and 7 into the manifold exhaust pipe 12', the cylinders 3 and 6 into the manifold exhaust pipe 13' and the cylinders 4 and 5 into the manifold exhaust pipe 14 (Figs. 1 and 7).

According to the invention a separate core 20 is disposed in the middle of the manifold exhaust pipes, and the arrangement, shown in the drawings, is distinguished in that the individual manifold exhaust gas pipes 11'—14' are helically and contiguously wound around the separate central core 20. The branch-off points at the manifold exhaust gas pipes of the branch pipes 11 to 18 are throughout of the same physical relation to the exhaust port connections, or to each respective port-hole on the cylinders to provide for alignment and substantially equal lengths of all branch-off pipes as shown in Fig. 1. While the drawings show branch-off points located on the top side of the manifold exhaust gas pipe system, bottom or lateral branch-off points may also be utilized. Fittings 23 are used to press the pipes 11'—14' upon the core 20 (Fig. 2).

A two part tubular envelope 21, 22 formed to provide for a water cooling jacket is placed around the aggregate of manifold exhaust gas pipes. According to the invention this jacket type envelope is supported by the core 20 and is mounted independently of the pipes 11'—14' and 11—18.

Fastening and supporting means are indicated in Fig. 3. It may be seen that the part or fitting 23 is pressed upon the pipes 11' and 12' by the cylindrical spring 24 and the screw nut 25 of the bolt 26. The bolts 26 are, according to the present invention, anchored in the tubular core 20. This type of fastening including resilient parts 24 permits of free heat expansion of the pipes 11' to 14'.

Fig. 3 also illustrates the mountings of the two-part envelope 21, 22 by the use of parts (i. e. the anchor bolts 26) of the fastening means for the pipes 11'—14' upon the core 20. Mounting and demounting of the envelope is thereby made independent from the fastening means of the pipes 11'—14'. After the two parts are set-up over the pipes 11'—14' a head-screw 27 is screw-threadedly connected to the anchor bolt 26 engaging same from its front end. It should be observed that according to my present invention there is no direct contact at any point between the envelope and the hot manifold exhaust gas pipe aggregate. Clearance is also maintained at the passage of the branch-off pipes through the envelope. Water pipe lines 39 and 40 (Fig. 1) are suitably attached to the water jacket to provide for the required cooling water supply and discharge.

Fig. 4 shows the type of mounting of the envelope upon the core 20 by an end cover plate 28 of the envelope 21, 22, permitting the core, the exhaust pipe aggregate and the envelope to expand freely.

The expansion joints 12'' and 13'' (Figs. 5 and 6) located at the preferred points already mentioned need no further description as the type of expansion joint shown is well known. They permit free expansion of the manifold exhaust pipes 11'—14' and 16—18.

The type of design shown in the Figs. 7—10 is generally similar to that shown in Figs. 1—6. The eight cylinders of the engine "A" are also indicated with the numerals 1—8. 11—18 are the exhaust gas conduits which are attached to the individual cylinder exhaust ports. These conduits are branches of the manifold exhaust gas pipes 11'—14' which with their respective branches run from the cylinder port-holes to the entrance openings of the exhaust gas turbine 19. The pipes 11'—14' are wound around and fastened on the core 20 in the same fashion as has been described with respect to Figs. 1-6. The fastening means, however, differ from that shown in Figs. 1-6. Thus straps or bands 29, 30 (Figs. 8, 10) are laid around the pipes 11'—14' and secured by means of screws 31. To provide the elastic strapping in order to permit heat expansion of the pipes, springs 33 are disposed under the screw-nuts 32.

In the embodiment of my invention shown in Figs. 7-10, the envelope differs from the one shown in Figs. 1-6. It is not provided for cooling and has two halves 34, 35 (Figs. 8, 9, 10) which are held together by a flange-plate 36. The two halves 34, 35 are provided with a laying in 41 of lagging material to prevent heat dissipation. In lieu of the lagging material 41 shown in Fig. 8, air spacing about the pipes may serve as the sole insulating medium to prevent dissipation of heat energy, as illustrated in Fig. 9.

Figs. 9 and 10, in addition to showing the strapping together of the manifold pipes, illustrate the mountings for the shell or envelope. Stud-rods 26 are anchored to the core 20 and the sheet metal plates forming the shell are fastened by screws 37 in the stud-rods 26 as shown. This arrangement for supporting the envelope upon the core is also entirely independent of the strapping or mountings of the manifold exhaust pipes to the core 20.

The iron sheets 34 and 35 forming the shell have suitable holes or openings at places where the branch-off pipes 11—18 pass through the walls of the shell, such holes or openings being large enough to provide complete clearance for outside surfaces of the branch-off pipes. The central tubular core 20 is supported as indicated to permit of free expansion.

Referring to Figs. 11 to 13 the cylinders of the internal combustion engines "A" are indicated by numerals 1—6. 11—16 are the branch-off pipes of the manifold exhaust gas pipes 11'—13', situated along one side of the engine, extending from cylinder port-holes to the turbine. The pipes 11'—13' are wound around the core 20 in the same fashion as previously described, and are also resiliently fastened to the core 20 to permit the exhaust pipes to expand freely; such fastening means have been described in connection with Figs. 1-6, and more specifically in connection with Fig. 3. The cylinders 1 and 6 exhaust through the manifold exhaust pipe 11' into the exhaust gas turbine 19; the cylinders 2 and 5 through the manifold exhaust pipe 12' and the cylinders 3 and 4 through the manifold exhaust pipe 13'.

The Figs. 11 and 12 illustrate a design without water cooling for the envelope. Fig. 13 is a cross-section relating to an envelope provided for water cooling. The water pipe lines 39 and 40 provide for water supply and water discharge.

The same or a similar exhaust gas manifold design can be used on engines with any number or arrangement of cylinders, also such as used for V- and H-type engines.

I claim:

1. An exhaust gas manifold arrangement for a multicylinder internal combustion engine having engine cylinders with exhaust ports, the exhaust gases of which are utilized to drive at least one turbine, said turbine being contained in a casing, said casing having entrance openings via which exhaust gases from the engine may be admitted said arrangement comprising a central, separate guide-core, a plurality of separate manifold exhaust gas pipes arranged around said guide-core to form an aggregate, branch-off pipes from said manifold pipes to the exhaust ports of the several engine cylinders, said branch-off pipes being located in relation to the several exhaust ports to provide for alignment and substantially equal lengths of all branch-off pipes, each of said manifold pipes having its discharge end connected in gas-tight relation with one of the entrance openings of the turbine casing and an envelope slidably fastened to said guide-core, and having an inside surface disposed in spaced relation with respect to all said manifold pipes and said branch-off pipes, said envelope further having openings through which said branch-off pipes extend to the engine exhaust ports.

2. In a multicylinder internal combustion engine the exhaust gases of which are utilized to drive a turbine, the cylinders of which engine are provided with inlet and exhaust ports, and a turbine with a plurality of gas entrances disposed at an extremity of a line of cylinders the exhaust gases of which are to be delivered to the turbine, an exhaust gas piping arrangement comprising a centrally disposed separate guide-core extending substantially parallel with a line of exhaust ports of the engine cylinders, a plurality of separate manifold exhaust pipes helically wound contiguously about said guide-core at a substantially constant rate of turn for substantially the entire length of each said pipe, said pipes having discharge ends in connection with the turbine entrances, and a branch-off pipe for and connecting the exhaust port of each cylinder with one of said manifold exhaust pipes, each of said manifold exhaust pipes being fed by at least one of said branch-off pipes, said branch-off pipes being of substantially identical length, and said winding of said manifold of exhaust pipes for said line of cylinders being such as to permit each of said branch-off pipes to be similarly aligned and to join said manifold exhaust pipes at approximately the same angle.

3. The arrangement as described in claim 2 wherein the discharge ends of the exhaust gas pipes are in gas tight relationship with the turbine entrances.

4. The arrangement as described in claim 2 wherein said arrangement is provided with a tubular envelope having an inside surface disposed in spaced relation with respect to all parts of the arrangement, said envelope being orificed to permit said branch-off pipes to extend through said envelope, and said envelope further being slidably secured to said guide core.

5. The arrangement as described in claim 2 wherein the manifold exhaust pipes are fastened upon the core by resilient means permitting heat expansion of the several manifold exhaust pipes.

6. The exhaust piping arrangement as described in claim 2 wherein said arrangement is enclosed in a tubular envelope, said envelope having an inside surface disposed in spaced relation with respect to all parts of the arrangement, said envelope further being orificed to permit said branch-off pipes to extend through said envelope.

7. The arrangement as described in claim 6 in which the envelope is double shelled to form a cooling medium jacket and the orifices in the envelope are dimensioned with respect to the branch-off pipes to permit complete clearance between the last said pipes and the portions of said envelope defining said orifices.

8. The arrangement as described in claim 6 wherein the envelope comprises removable end walls, at least one of said walls being apertured to permit extension therethrough of the guide-core and manifold exhaust pipes, said wall including means for slidable fixation upon said core thereby permitting free expansion of the core, the manifold exhaust pipes and the envelope relative to each other.

9. The arrangement as described in claim 6 wherein the envelope is secured to the core by screw thread engaging means on stud rods which are anchored to said core, extend radially outward between the several manifold pipes to the surrounding envelope and are provided with threaded ends.

10. The arrangement as described in claim 2 wherein said arrangement is housed in an envelope and the inside surface area of the envelope is provided with layers of heat insulating material.

11. The arrangement as described in claim 2 wherein said arrangement is housed in an envelope, said envelope having an inside surface disposed in spaced relation to all parts of the aggregate, said envelope being orificed to permit the branch-off pipes to extend therethrough, and the free space within the envelope surrounding the said aggregate is filled with heat insulating material.

12. The arrangement as described in claim 2 wherein the said manifold pipes are constituted of sections to facilitate their assembly about the core and the ends of said pipe sections which are brought together are provided with expansion joints.

13. The arrangement as described in claim 2 wherein the aggregate is strapped together about the core with a band and spring means constantly urging the said manifold pipes radially inwardly toward the core whereby heat expansion of the last said pipes may occur by the yielding of the spring means.

14. In a multicylinder internal combustion engine the exhaust gases of which are utilized to drive a turbine, the cylinders of which engine are provided with inlet and exhaust ports, and a turbine with a plurality of gas entrances disposed at one extremity of a line of cylinders the exhaust gases from which are to be delivered to the turbine, an exhaust gas piping arrangement comprising a centrally disposed separate guide-core extending substantially parallel with the line of exhaust ports of the engine cylinders, a plurality of separate manifold exhaust pipes helically wound contiguously about said guide-core at a substantially constant rate of turn for substantially the entire length of each said pipe, one of the ends of each manifold pipe constituting the gas discharge end and being connected to an entrance to the turbine, and the other end being turned toward and connected with the exhaust port of one of the engine cylinders to constitute a head branch pipe, and a branch-off pipe for and connecting each of the other exhaust ports to one of said manifold pipes, said winding being so arranged and said branch-off pipes and head pipes so connected with cylinder exhaust ports all being of substantially identical length and disposed to extend from said ports to the manifold pipes at approximately the same angle.

References Cited in the file of this patent

UNITED STATES PATENTS

| Number | Name | Date |
|---|---|---|
| 1,796,651 | Harty et al. | Mar. 17, 1931 |
| 2,125,703 | Williams | Aug. 2, 1938 |
| 2,242,604 | Wells | May 20, 1941 |
| 2,289,596 | Seamons et al. | July 14, 1942 |
| 2,423,574 | Barrett | July 8, 1947 |
| 2,455,493 | Jacobs | Dec. 7, 1948 |
| 2,479,318 | Cramer | Aug. 16, 1949 |